(12) United States Patent
Ignaczak et al.

(10) Patent No.: US 7,770,937 B2
(45) Date of Patent: Aug. 10, 2010

(54) STEPPED BALL JOINT PIPE CLAMP AND PRE-ATTACHMENT COMPONENTS THEREFOR

(75) Inventors: Brian T. Ignaczak, Rochester, MI (US); Michael E. Amedure, Lake Orion, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 12/025,542

(22) Filed: Feb. 4, 2008

(65) Prior Publication Data
US 2008/0185841 A1 Aug. 7, 2008

Related U.S. Application Data

(60) Provisional application No. 60/888,096, filed on Feb. 4, 2007.

(51) Int. Cl.
*F16L 27/04* (2006.01)
(52) U.S. Cl. .................. 285/261; 285/420; 285/410
(58) Field of Classification Search ............... 285/420, 285/410, 261, 367, 263, 407, 409, 419, 365, 285/366, 373
See application file for complete search history.

(56) References Cited

U.S. PATENT DOCUMENTS

| | | | | |
|---|---|---|---|---|
| 1,561,033 A | * | 11/1925 | Spencer | 285/146.3 |
| 1,714,563 A | * | 5/1929 | Kiel | 285/263 |
| 1,739,472 A | * | 12/1929 | Sweney | 285/261 |
| 1,949,055 A | * | 2/1934 | Lambie | 285/5 |
| 2,175,712 A | * | 10/1939 | Westermayer | 285/146.2 |
| 2,459,389 A | * | 1/1949 | Newman | 285/5 |
| 2,556,659 A | * | 6/1951 | Patterson | 285/145.3 |
| 2,709,094 A | | 5/1955 | Polanski | |
| 3,544,137 A | * | 12/1970 | Contreras et al. | 285/261 |
| 4,261,600 A | | 4/1981 | Cassel | |
| 4,312,526 A | | 1/1982 | Cassel | |
| 4,408,785 A | * | 10/1983 | Legros et al. | 285/49 |
| 4,629,226 A | | 12/1986 | Cassel et al. | |

(Continued)

FOREIGN PATENT DOCUMENTS

DE 434908 10/1926

(Continued)

OTHER PUBLICATIONS

Korean Search Report for Application PCT/US2008/052930; Jun. 16, 2008, 2 pages.

*Primary Examiner*—David E Bochna
(74) *Attorney, Agent, or Firm*—Reising Ethington P.C.

(57) ABSTRACT

A pipe clamp that is used over a ball joint formed between a balled end of a first pipe and a flared end of a second pipe. The pipe clamp has a band and a tightening mechanism. The band extends axially from a first edge to a second edge, and extends circumferentially from a first end to a second end. The band has a step formed circumferentially in a body of the band between the first and second edge. The step accommodates a stepped seam that is produced between the balled end and the flared end when they are overlapped with respect to each other. The tightening mechanism draws the first and second ends of the band toward and away from each other in order to respectively tighten and loosen the pipe clamp.

20 Claims, 4 Drawing Sheets

U.S. PATENT DOCUMENTS

| | | |
|---|---|---|
| D289,141 S | 4/1987 | Tunno et al. |
| 4,813,720 A | 3/1989 | Cassel |
| 6,269,524 B1 | 8/2001 | Cassel |
| 6,389,654 B1 | 5/2002 | Tunno et al. |
| 6,519,815 B2 | 2/2003 | Cassel et al. |
| 6,758,501 B2 | 7/2004 | Amedure et al. |
| 6,877,780 B2 | 4/2005 | Potts et al. |
| 7,025,393 B2 | 4/2006 | Amedure et al. |
| 7,055,223 B2 | 6/2006 | Cassel et al. |
| 7,249,790 B2 | 7/2007 | Potts et al. |
| 7,252,310 B2 | 8/2007 | Amedure et al. |
| 7,320,486 B2 * | 1/2008 | Geppert et al. ............... 285/420 |
| 7,399,005 B2 * | 7/2008 | Rigollet et al. ............... 285/407 |
| 7,410,192 B2 | 8/2008 | Ignaczak et al. |
| 7,431,345 B2 * | 10/2008 | Quackenbush et al. ...... 285/261 |
| 7,458,619 B2 * | 12/2008 | Cassel et al. ................. 285/420 |
| 7,475,919 B2 | 1/2009 | Hiernard et al. |
| 7,490,871 B2 | 2/2009 | Avram et al. |
| 7,520,539 B2 | 4/2009 | Ignaczak et al. |
| 2006/0202480 A1 | 9/2006 | Cassel et al. |

FOREIGN PATENT DOCUMENTS

| | | |
|---|---|---|
| DE | 3404739 | 7/1985 |
| DE | 19904409 | 8/2000 |
| GB | 2037922 | 7/1980 |
| GB | 2156932 | 10/1985 |
| JP | 06-185677 | 7/1994 |
| JP | 09-303628 | 11/1997 |

* cited by examiner

STEPPED BALL JOINT PIPE CLAMP AND PRE-ATTACHMENT COMPONENTS THEREFOR

CROSS-REFERENCE TO RELATED APPLICATION

This application claims the priority of U.S. Provisional Application No. 60/888,096, filed Feb. 4, 2007, the complete disclosure of which is hereby incorporated by reference.

TECHNICAL FIELD

This invention relates to pipe clamps and ball joints used for interconnecting two pipe ends.

BACKGROUND OF THE INVENTION

Pipe clamps are commonly used to join variously configured pipe ends in vehicle exhaust systems. One example is a pipe coupler which joins two pipe ends that are telescopically-connected such that the central axis of the smaller pipe end is coincident with that of the larger pipe end. The clamp can include a shoulder to accommodate the difference in pipe diameters to help achieve a strong clamping force on both the larger and smaller diameter pipe ends. See, for example, U.S. Pat. Nos. 4,261,600 and 4,312,526 to Cassel. Another example is a pipe clamp of the type used for a ball and flare joint in which a flared end partially overlaps a balled end when the two pipe ends are mated. This type of joint is referred to herein as a ball joint and it allows a certain amount of swivel of the balled end relative to the flared end before tightening the pipe clamp. Once clamped, the ball joint provides a fluid-tight connection between pipe ends even though a certain amount of angular misalignment of the pipe ends may exist. As used herein, angular misalignment means that that the axial centerlines of the two pipe ends are angled relative to each other and thus not coincident. A typical ball joint suitable for automotive exhaust system applications can, for example, be designed to accommodate up to about five degrees of angular misalignment of the pipe axes.

U.S. Patent Application Publication No. 2005/0029813 A1 discloses a ball joint and associated barrel shaped clamp. The balled insertion end section of one pipe includes two different spherical zones, with the second zone being located at the terminal end of the pipe and having a smaller outer radius that accommodates the wall thickness of the receiving end section of the other pipe. This allows the respective outer radii $R_1$ and $R_3$ of the first zone and receiving end section to be the same, such that together they substantially match the inner surface conformation of the barrel shaped clamp. This configuration uses a multiple-radius partially spherical conformation of the pipe end.

SUMMARY OF THE INVENTION

One aspect of the invention is directed to a ball joint pipe clamp that is used to join a balled end of a first pipe and an overlapping flared end of a second pipe. The ball joint pipe clamp includes a band and a tightening mechanism. The band extends in an axial direction from a first edge to a second edge, and extends in a circumferential direction from a first end to a second end. The band has a step that is formed in a body of the band and that accommodates a seam produced between the overlapping balled and flared ends. The tightening mechanism draws the first and second ends toward and away from each other in order to tighten and loosen the band.

Another aspect of the invention is directed to a ball joint that includes a balled end, a flared end, and a pipe clamp. The balled end has an outer surface with a first radius. The flared end overlaps the balled end and has an inner surface with a second radius. The pipe clamp has a band that overlaps both the balled end and the flared end. The first radius is greater than the second radius, resulting in a circumferential sealing contact that is produced between the outer surface and the inner surface, with the outer and inner surfaces diverge away from each other in a direction away from the sealing contact.

Another aspect of the invention is directed to a ball joint assembly that includes a first pipe, a second pipe, and a pipe clamp. The first pipe has a balled end that with an outer surface having a first radius. The second pipe has a flared end that overlaps the balled end. The flared end has a free end and an inner surface having a second radius that is less than the first radius. The pipe clamp includes a band that overlaps both the balled end and the flared end. The band extends in an axial direction from a first edge to a second edge, and extends in a circumferential direction from a first end to a second end. The band has a step that is formed circumferentially in a body of the band. The step accommodates a circumferential seam that is produced between the overlapping balled and flared ends. The band is attached to the flared end at a weld point that is adjacent the second end of the band. The pipe clamp includes a tightening mechanism that draws the first and second ends of the band toward and away from each other to thus tighten and loosen the band. A circumferential sealing contact is produced between the outer surface of the balled end at its midsection and the inner surface of the flared end at its free end. These inner and outer surfaces diverge away from each other to accommodate irregularities in the inner surface of the flared end that may have been introduced during welding of the clamp onto the flared end.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
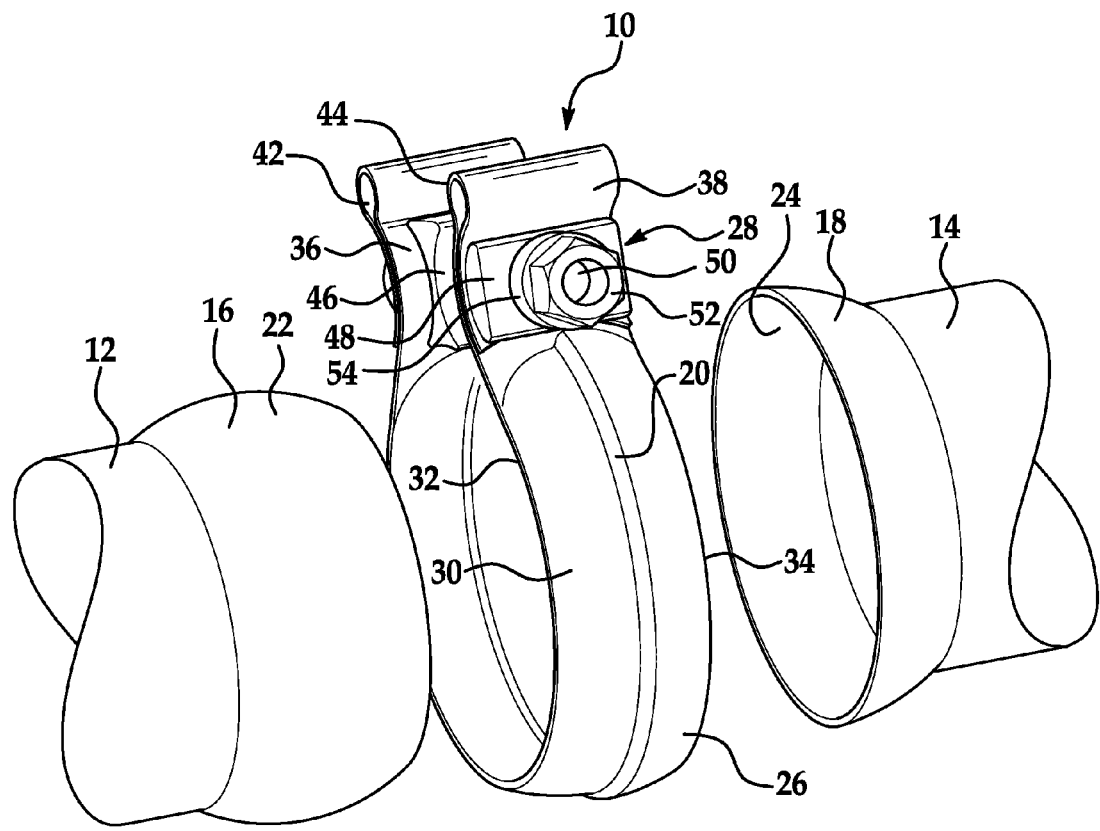
FIG. 1 is an exploded view of a first pipe, a pipe clamp, and a second pipe.

Referring now to the drawings, FIGS. 1-8 show several embodiments of a pipe clamp 10 and pre-attachment components that can be used to secure a ball joint formed between a first pipe 12 and a second pipe 14. The pipe clamp 10 provides, among other things, a fluid-tight seal with a high degree of pull-apart strength between a balled end 16 and a flared end 18 that overlap with respect to each other. A step 20 formed in the pipe clamp 10 conforms the pipe clamp to the stepped outer surface of the ball joint that is formed by the overlapping ends. Because the components will be described having generally circular cross-sections, the terms axially, radially, and circumferentially as used herein refer to directions relative to this circular shape, such that the axial direction extends along the axis of the circular shape, the radial direction extends radially away from this axis, and the circumferential direction extends around the circumference of the circular shape.

Figure 2:
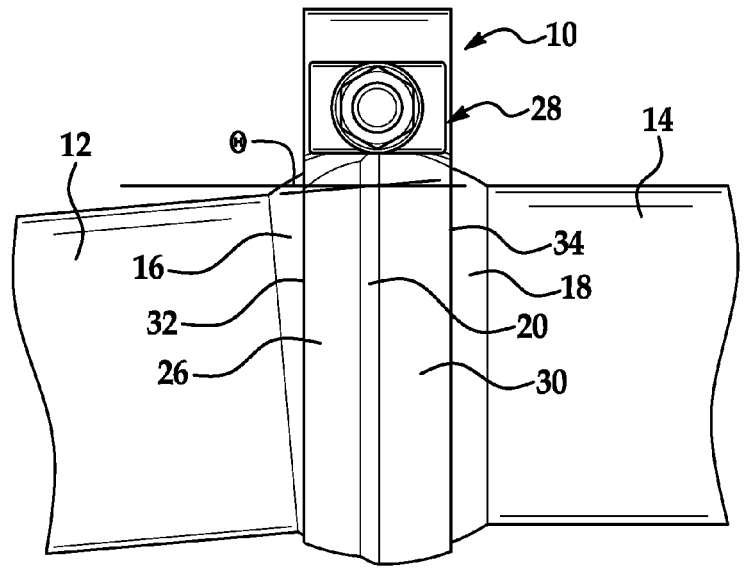
FIG. 2 is a side view of the pipe clamp of FIG. 1 shown assembled with the first pipe and the second pipe.
Figure 3:
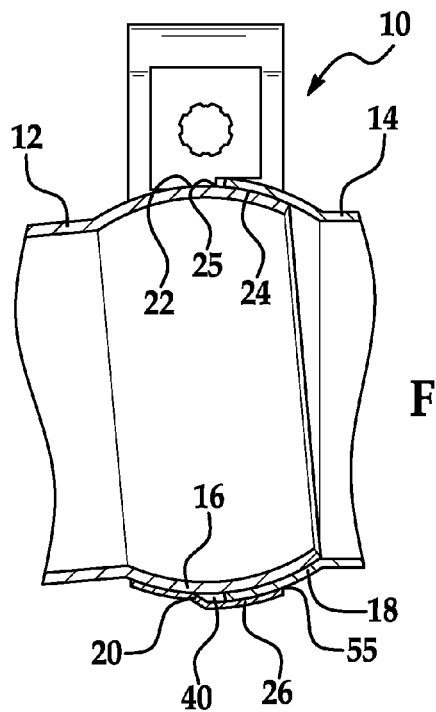
FIG. 3 is a sectional view taken of the pipe clamp of FIG. 2.

FIG. 1 shows the first pipe 12 and the second pipe 14 of an automobile exhaust system. As shown, the pipes themselves have the same nominal diameter with an outer surface 22 of the balled end 16 being shaped to mate against an inner surface 24 of the flared end 18 to thereby form a ball joint between the first and second pipes 12 and 14. The balled end 16 and the flared end 18 have somewhat complementary spherical profiles that, when mated and the pipe clamp 10 is tightened, form at least one seal at an interface between the outer surface 22 and the inner surface 24 (FIG. 3). The spherical profile of the balled end 16 has a greater arc length than that of the flared end 18. When mated but not necessarily tightened, the radially offset balled end 16 and flared end 18 form a circumferential seam 25. In this condition, the first pipe 12 can swivel about the ball joint with respect to the second pipe 14 to define an angle Θ (FIG. 2). The angle Θ represents the amount of angular misalignment of the two pipe ends and, in the illustrated embodiment, can reach a maximum of about 5° while still allowing an effective seal at the ball joint when the pipe clamp 10 is tightened. For other embodiments, the ball joint of the two pipe ends can be designed to accommodate a maximum misalignment that is more or less than this, depending upon the particular application.

A first embodiment of the pipe clamp 10 is shown in FIGS. 1-3. In general, the pipe clamp 10 encircles the mated ends 16 and 18 and can be tightened to exert an evenly distributed axial and radial force that seals and strengthens the ends. The pipe clamp 10 is constructed to seal a ball joint similar to the one shown and described. To do so, the pipe clamp 10 includes a band 26 that wraps around the mated ends 16 and 18 and is then tightened about the ends by a tightening mechanism 28.

The band 26 is dimensioned to wrap around the ball joint and provide various forces thereat when tightened. The band 26 can be stamped or cut from a sheet metal material (e.g., stainless, galvanized steel, or the like) and then stamped or drawn by known metalworking processes to form its circular shape. The step 20 can be formed concurrently in the band 26 when forming its circular shape, and suitable materials, tools, and techniques used to form the stepped band 26 and its tightening mechanism 28 are known to those skilled in the art. Once formed, the band 26 has a roundish body 30 extending axially from a first edge 32 to a second edge 34 and extending circumferentially from a first end 36 to a second end 38.

The step 20 allows the body 30 to conform to the circumferential seam 25. In other words, the step 20 accommodates the circumferential seam 25 so the pipe clamp 10 can effectively seal the ball joint. As shown in FIG. 1, the step 20 is formed continuously around the circumference of the body 30, and lies parallel with, and between, the first edge 32 and the second edge 34. The step 20 is positioned axially about midway along the body 30 so that when the pipe clamp 10 is tightened, sufficient band material is provided on each side of the step to provide an effective seal. As shown in FIG. 3, the step 20 can be defined by a slanted portion in the body 30, and although not shown, the step 20 could also be defined by a more perpendicular (radially extending) portion. In either case, the step 20 elevates one side of the body 30 with respect to its other side so as to define a circumferentially continuous elevated side having one radius, and a circumferentially continuous unelevated side having a radius lesser in value than the elevated side. The elevated side is raised above the unelevated side by a distance that can be similar to the wall thickness of the flared end 18 so that when the pipe clamp 10 is assembled on the ball joint, the elevated side defines a space 40 to receive the flared end 18. If desired, the amount of step can be somewhat less than or greater than the wall thickness of flared end 18 to control the relative amount of pressure applied to each of the two pipe ends during tightening of the clamp.

Referring to FIG. 1, the first and second ends 36 and 38 oppose each other at the tightening mechanism 28. The first and second ends 36 and 38 are each formed as radially-extending flanges by folding unitary extensions of the body 30 radially outwardly and then back onto themselves to create a double-layered section of sheet metal. This forming operation is also used to define a first and second loop 42 and 44 at the outer radial ends of the flanges. Each double-layered section is apertured (not shown) for receiving a part of the tightening mechanism 28.

The tightening mechanism 28 draws the first and second ends 36 and 38 toward and away from each other to respectively tighten and loosen the pipe clamp 10. Those skilled in the art will appreciate that different tightening mechanisms other than the one shown can be used with the pipe clamp 10. As shown, the tightening mechanism 28 is connected to the first and second ends 36 and 38 of the band 26. The tightening mechanism 28 can include a reaction member 46 that separates the first and second ends 36 and 38, and can include a spacer bar 48 positioned on the opposite side of the second end 38. Both the reaction member 46 and the spacer bar 48 are apertured to receive a bolt 50 that is tightened with a nut 52 and a washer 54. Further construction and operation of this type of tightening mechanism will be known to those skilled in the art.

In use, the balled end 16 and the flared end 18 are mated together in an overlapping manner with the flared end over the balled end to form the ball joint. Before being completely mated, the pipe clamp 10 can be fitted over the flared end 18 so that the balled end 16 can be inserted into the clamp and against the inner surface 24 of the flared end 18. The pipe clamp 10 is positioned over the flared end 18 at the elevated band side until the very edge of the flared end reaches the step 20. In this way, the step 20 serves to position the pipe clamp 10 on the flared end 18. In one embodiment, the band 26 can be welded to the flared end 18 at a weld point 55 (FIGS. 3 and 8) located adjacent the second edge 34 in order to pre-assemble the band to the second pipe. The weld point 55 can be a circumferential weld line, one or more weld spots spaced circumferentially around the band 26, or the like. The balled end 16 is then inserted in the pipe clamp 10 and in the flared end 18. The first pipe 12 can be swiveled about the ball joint to a desired orientation. As the clamp in tightened, the unelevated side of the band 26 can, in some conditions, bear substantially flush against the outer surface 22 of the balled end 16, and the elevated side of the band 26 can bear substantially flush against the outer surface of the flared end 18. An axial load forces the two pipe ends together to form at least one seal between the outer surface 22 and the inner surface 24. This seal forms even where there is angular misalignment of the pipe ends.

Figure 8:
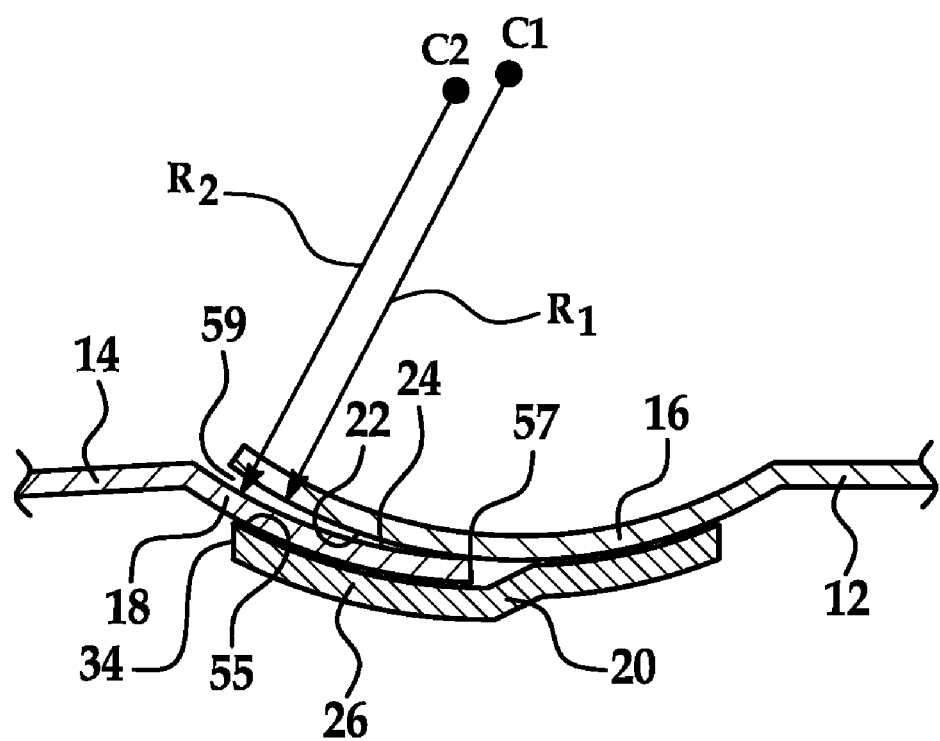
FIG. 8 is a fragmentary sectional view of a pipe clamp as in any of the previous figures showing it pre-attached by a weld with the pipe ends being dimensioned to obtain sealing contact at a location that is axially spaced from the weld.

The exact seal produced between the balled end 16 and the flared end 18 can be dependent on, among other things, the respective radii of the balled end, the flared end, and the band 26. In one example, the radius of the outer surface 22 of the balled end 16 is equal to the radius of the inner surface 24 of the flared end 18 which theoretically produces a surface-to-surface seal where the outer surface 22 is flush against the inner surface 24. In some cases though, this condition may be undesirable such as where the clamp is pre-attached to the flared end 18 by welding. The welding of the clamp to the outer surface of the flared end 18 may warp or otherwise impact the regularity or smoothness of the inner surface 24 which may interfere with or otherwise disrupt the surface-to-surface seal, thus adversely affecting the quality of the seal. One solution that avoids this situation is shown in FIG. 8, where the outer surface 22 of the balled end 16 can have a first radius R1 measured from a center C1, and the inner surface 24 of the flared end 18 can have a different, second radius R2 measured from a center C2. The weld 55 used to pre-attach the clamp 10 onto pipe 14 is located at the edge 34 of the clamp and at a mid-section of the flared end 18, with the first radius R1 being greater than the second radius R2 by a value x. As a result of providing the flared end 18 with a smaller radius than that of the balled end 16, while locating the weld at a point 55 that is adjacent the outer axial edge 34 of the clamp, the resulting configuration produces a sealing contact 57 that is axially away from the weld point 55 as shown.

The sealing contact 57—shown as a point in cross-section—can be a sealing line formed circumferentially between a free or terminal end of the flared end 18 and a midsection of the balled end 16, while the opposing outer surface 22 and inner surface 24 diverge away from the sealing contact 57 and in a direction toward the free end of the balled end to define a gap 59. The gap 59 spaces the outer surface 22 away from any weld irregularity or warp existing on the inner surface 24, and thus prevents any potential sealing interference, ensuring an effective seal at contact point 57. In one example where the first and second pipe 12 and 14 are about 45.00 mm in diameter, the first radius R1 can be about 27.75 mm and the second radius R2 can be about 27.15 mm, giving the value x as about 0.60 mm. These dimensions could produce the condition described with the sealing contact 57 and diverging opposing surfaces. In some embodiments, the nominal difference x between the two radii can be in the range of about 0.4 mm for smaller diameter pipes (e.g., under 45 mm diameter pipes) to 1.0 mm for larger diameter (e.g., over 90 mm pipes). In other embodiments, the difference x between the two radii can be about 0.6 mm for pipes having any nominal outer pipe diameter from about 38 mm to about 130 mm. The tolerance on these pipe dimensions (pipe diameter and flare/ball radius) can be, for example, +/−0.25 mm, such that the difference x in radii can potentially vary from as little as 0.10 mm to as much as 1.1 mm.

As will be appreciated by inspection of FIG. 3, the use of the stepped configuration of the clamp results in the axial amount of contacting overlap between the clamp and the balled end, and between the clamp and the flared end, remaining constant at all points about the circumference of the joint, regardless of whether or not there is angular misalignment between the pipe ends. That is, with the clamp positioned over the ball joint such that it is aligned with the flared end (meaning that it is oriented in a plane normal to the axial centerline of the flared end), the axial amount of contacting engagement between the clamp and balled end is the same at all circumferential locations about the balled end, regardless of the whether or not there is angular misalignment between the pipe ends.

Figure 4:
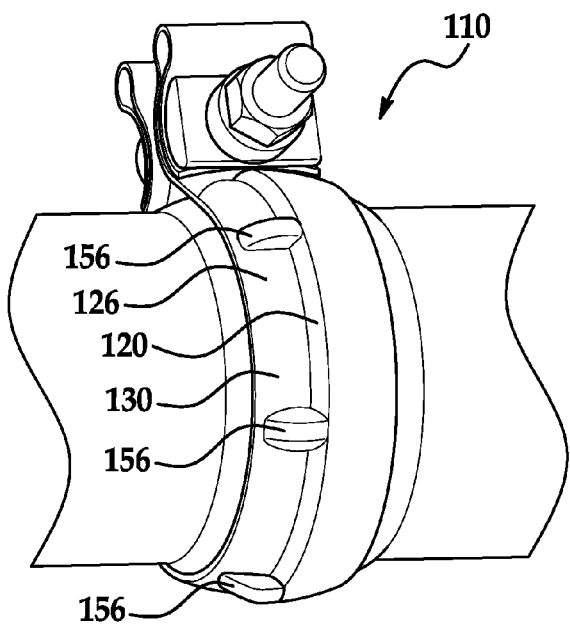
FIG. 4 is a perspective view of a second embodiment of a pipe clamp shown assembled with a first pipe and a second pipe.

FIG. 4 shows a second embodiment of a pipe clamp 110. Elements of this embodiment that correspond to similar elements of the first embodiment of FIGS. 1-3 are identified with numerals offset by 100 from those used in that embodiment. Some of the parts in the second embodiment are similar to those as described in the first embodiment, such as the tightening mechanism, so their description is not repeated here.

Here, a band 126 has a plurality of axial strengthening ribs or beads 156 that are formed in a body 130 of the band 126 to increase the exerted axial force on the ball joint and also strengthen the body 130. In some cases, the beads 156 impart elasticity to the band 126, meaning that the band 126 is capable of returning to, or close to, its original shape after it is used and untightened. The beads 156 can be formed by a separate metal drawing process in the body 130 after the body itself has been drawn. Those skilled in the art will appreciate that other metal forming processes can be used to form the beads 156. As shown, the beads 156 are oval-shaped and spaced equally apart about the circumference of an unelevated side of the band 126. The beads 156 can extend axially up to a step 120 such that the step is discontinuous at each bead. The height of each bead in this embodiment is equal to the height of the step 120. More or less of the beads can be provided, and they can be of various shapes as appropriate for a particular application.

Figure 5:
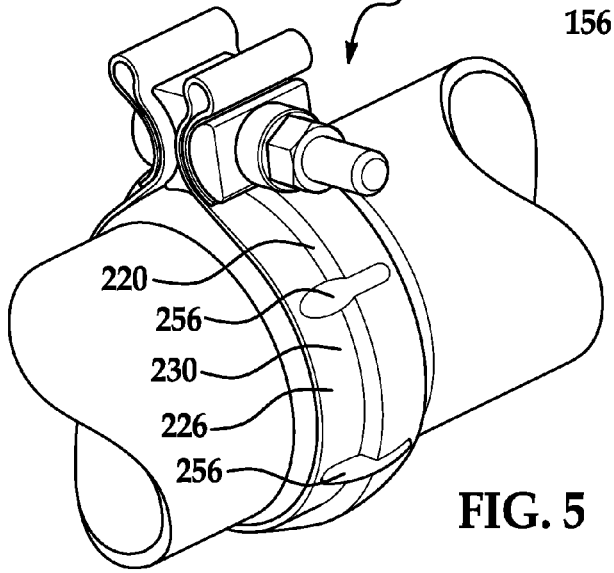
FIG. 5 is a perspective view of a third embodiment of a pipe clamp shown assembled with a first pipe and a second pipe.

FIG. 5 shows a third embodiment of a pipe clamp 210. Elements of this embodiment that correspond to similar elements of the first embodiment of FIGS. 1-3 are identified with numerals offset by 200 from those used in that embodiment. Some of the parts in the third embodiment are similar to those as described in the first embodiment, such as the tightening mechanism, so their description is not repeated here.

Here, a band 226 has a plurality of axial strengthening ribs or beads 256 that are formed in a body 230 of the band 226 to increase the exerted axial force on the ball joint and also strengthen the body 230. In some cases, the beads 256 impart elasticity to the band 226, meaning that the band 226 is capable of returning to, or close to, its original shape after it is used and untightened. The beads 256 can be formed by a separate metal drawing process in the body 230 after the body itself has been drawn. Those skilled in the art will appreciate that other metal forming processes can be used to form the beads 256. As shown, the beads 256 are oval-shaped at one end and cylindrically-shaped at another end. The oval-shaped end can extend up to a step 220 on an unelevated side of the band 226, and the cylindrically-shaped end can extend beyond the step 220 on an elevated side of the band 226. Together, the two ends extend across the step 220. The beads 256 can be spaced equally apart and circumferentially around the band 226. The height of each bead in this embodiment is greater than the height of the step 120. More or less of the beads can be provided, and they can be of various shapes as appropriate for a particular application.

Figure 6:
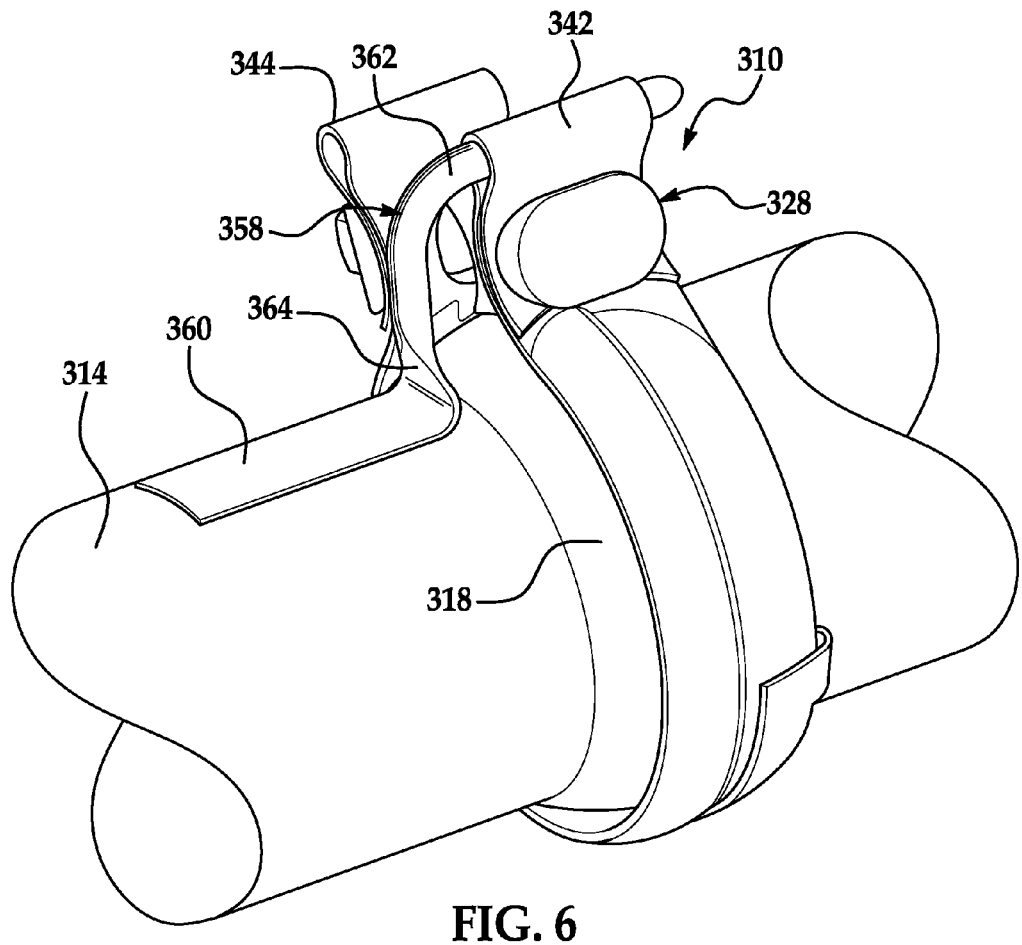
FIG. 6 is a perspective view of an attachment bracket used to pre-attach a pipe clamp to a pipe.

FIG. 6 shows an attachment bracket that can be used to pre-attach the pipe clamp to one of the pipe ends. Elements in this drawing that correspond to similar elements of the first embodiment of FIGS. 1-3 are identified with numerals offset by 300 from those used in that embodiment. Some of the parts in this drawing are similar to those as described in the first embodiment, such as the tightening mechanism, so their description is not repeated here.

Here, a bracket 358 is used with a pipe clamp 310, which can be the same or different as any of the first three pipe clamp embodiments described above. The bracket 358 helps maintain positioning of the clamp 310 when pre-assembled on a flared end 318 of a second pipe 314. This aids in assembly of the clamp and ball joint. The bracket 358 can be used in addition to, or in lieu of, the weld point 55. In particular, the bracket 358 engages a tightening mechanism 328 and prevents the clamp 310 from twisting on the flared end 318, or otherwise being misoriented. The bracket 358 can be made out of a tempered stainless steel, or the like, to impart a certain amount of resilience in the part. The bracket 358 has a base 360 that is attached to the second pipe 314, and a projection 362 extending above and beyond the flared end 318. The base 360 is slightly arcuate to complement the shape of the second pipe 314. The projection 362 is unitary with the base 360 and has a cylindrical shape throughout its body that is sized to fit within a first loop 342 or a second loop 344 of the tightening mechanism 328. The projection 362 extends radially away from the base 360, and then bends in the axial direction. A union 364 connects the base 360 and the projection 362, and provides a certain amount of radial and circumferential deflection to the projection that may be needed when the pipe clamp 310 is tightened. The bracket 358 can be made from a single strip of metal that is rolled to form the projection 362 which starts at union 364. Lateral edges of the strip can be rolled back into abutment with each other to form a seamed cylindrical shape that is then bent 90° partway along its length using a radius to maintain tube strength. The free end of the projection 362 can be rounded or conical to assist in insertion of the projection into the loop 342. Furthermore, this free end can be formed as an enlarged head that requires press-fitting of the head of the projection through the loop 342 so that it does not easily become disengaged by relative axial movement.

In use, the bracket 358 can be spot-welded to an outer surface of the second pipe 314 near the flared end 318 such that the projection 362 is positioned above and beyond the flared end. When the pipe clamp 310 is pre-assembled onto the flared end 318, the projection 362 is inserted all the way through either the first or second loop 342, 344. This keeps the pipe clamp 310 on the flared end 318, and prevents it from being misoriented before the ball joint is formed and the pipe clamp 310 is tightened.

Figure 7:
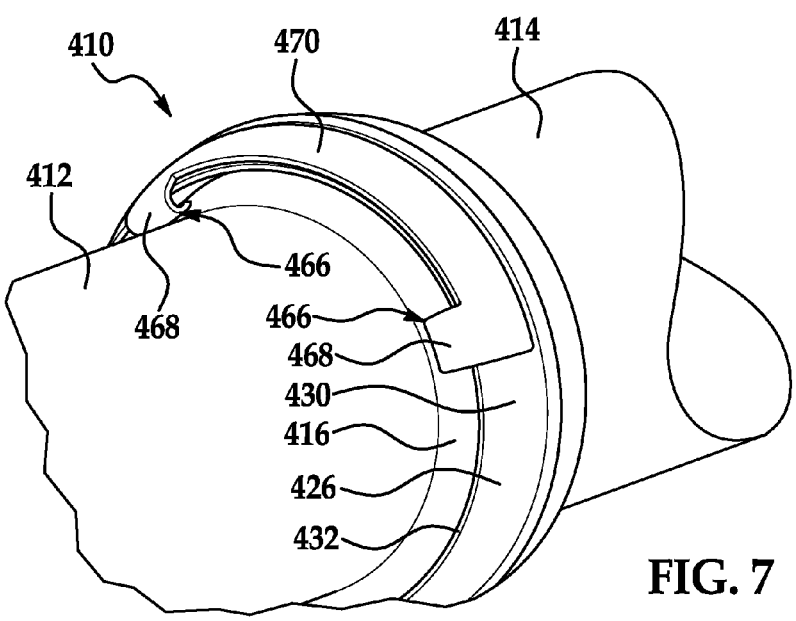
FIG. 7 is a perspective view of an attachment clip used to retain a pipe clamp to a pipe.

FIG. 7 shows an attachment clip that can be used with or without the bracket 358 to pre-attach the pipe clamp to one of the pipe ends. Elements of this drawing that correspond to similar elements of the first embodiment of FIGS. 1-3 are identified with numerals offset by 400 from those used in that embodiment. Some of the parts in this drawing are similar to those as described in the first embodiment, such as the tightening mechanism, so their description is not repeated here.

Here, a band 426 includes a clip having a pair of oppositely disposed fingers 466 projecting axially beyond and radially below a first edge 432 of the band. The fingers 466 are used as discussed below to retain a balled end 416 of a first pipe 412 in position within a clamp 410. The fingers 466 can be made out of a tempered stainless steel, or the like, to impart a certain amount of resilience in the parts. The fingers can be curled partly underneath the first edge 432 to define a curved end 468. The radially-inwardly facing surface and free end of the fingers extend radially inwardly of the clamp so that they engage the outer surface of the balled end 416 near its junction with the remainder of pipe end 412. A base 470 of the clip can be provided to weld the fingers 466 to an unelevated side of the band 426. Other embodiments can be implemented without such a base, and instead can be implemented as individual fingers separately attached to the band or as unitary extensions off the lateral edge 432 of the band 426.

In use, the fingers 466 engage the balled end 416 with the curved ends 468 allowing the fingers 466 to ride up on an outer surface of the balled end 416. When this happens, the fingers 466 flex radially thus exerting a force on the balled end 416 that forces the balled end towards the opposite circumferential side of the clamp where it engages the inside surface of the clamp. Where the clamp is first pre-attached to the flared end 418, such as by welding or using the bracket 358, this snap fit of the balled end 416 into engagement with both the clamp 410 and flared end 418 keeps the clamp and pipe ends loosely connected so that an installer is more free to work on tightening and final positioning of the clamp. The fingers 466 still allow the first pipe 412 to swivel about the ball joint before the pipe clamp 410 is fully tightened.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A ball joint pipe clamp to join a first pipe having a balled end and a second pipe having a flared end that overlaps the balled end, the ball joint pipe clamp comprising:

a band extending axially from a first edge to a second edge and extending circumferentially from a first end to a second end, said band having a step formed circumferentially therearound and axially between said first and second edges, said step accommodating a seam produced between the overlapping balled end and flared end, said step forming in said band an elevated side that includes said first edge and an unelevated side that includes said second edge, said elevated side having one radius and said unelevated side having another radius that is less than the radius of said elevated side; and a tightening mechanism connected to said first and second ends and having a fastener for drawing said first and second ends toward and away from each other to respectively tighten and loosen said band.

2. A ball joint pipe clamp as defined in claim 1, wherein said band has a plurality of circumferentially spaced strengthening beads, each of said plurality of beads extending axially from one end of said bead that is located on said unelevated side of said band to another end of said bead that is located at said step.

3. A ball joint pipe clamp as defined in claim 1, wherein said band has a single step formed circumferentially therearound and axially between said first and second edges.

4. A ball joint pipe clamp to join a first pipe having a balled end and a second pipe having a flared end that overlaps the balled end, the ball joint pipe clamp comprising:
- a band extending axially from a first edge to a second edge and extending circumferentially from a first end to a second end, said band having a step formed circumferentially therearound and axially between said first and second edges, said step accommodating a seam produced between the overlapping balled end and flared end, said step forming in said band an elevated side that includes said first edge and an unelevated side that includes said second edge;
- wherein, when tightened, said elevated side of said band bears substantially flush against an outer surface of the flared end, and said unelevated side of said band bears substantially flush against an outer surface of the balled end; and
- a tightening mechanism connected to said first and second ends and having a fastener for drawing said first and second ends toward and away from each other to respectively tighten and loosen said band.

5. A ball joint pipe clamp to join a first pipe having a balled end and a second pipe having a flared end that overlaps the balled end, the ball joint pipe clamp comprising:
- a band extending axially from a first edge to a second edge and extending circumferentially from a first end to a second end, said band having a step formed circumferentially therearound and axially between said first and second edges, said step accommodating a seam produced between the overlapping balled end and flared end, said step forming in said band an elevated side that includes said first edge and an unelevated side that includes said second edge;
- wherein said band has a plurality of circumferentially spaced strengthening beads, each of said plurality of beads extending axially from one end of said bead that is located on said unelevated side of said band to another end of said bead that is located on said elevated side of said band, said plurality of beads each having a first shape at one section of said bead and a second shape at another section of said bead; and
- a tightening mechanism connected to said first and second ends and having a fastener for drawing said first and second ends toward and away from each other to respectively tighten and loosen said band.

6. A ball joint pipe clamp to join a first pipe having a balled end and a second pipe having a flared end that overlaps the balled end, the ball joint pipe clamp comprising:
- a band extending axially from a first edge to a second edge and extending circumferentially from a first end to a second end, said band having a step formed circumferentially therearound and axially between said first and second edges, said step accommodating a seam produced between the overlapping balled end and flared end; and
- a tightening mechanism connected to said first and second ends and having a fastener for drawing said first and second ends toward and away from each other to respectively tighten and loosen said band;
- wherein at least one of said first and second ends includes a loop located radially outwardly of said tightening mechanism, and wherein the ball joint pipe clamp further comprises a bracket used to help maintain the position of the ball joint pipe clamp when the ball joint pipe clamp is pre-assembled on the flared end, said bracket having a base attached to the second pipe and having a projection extending from said base and being dimensioned and positioned such that said projection fits within said loop when the pipe clamp is assembled loosely over the flared end.

7. A ball joint pipe clamp to join a first pipe having a balled end and a second pipe having a flared end that overlaps the balled end, the ball joint pipe clamp comprising:
- a band extending axially from a first edge to a second edge and extending circumferentially from a first end to a second end, said band having a step formed circumferentially therearound and axially between said first and second edges, said step accommodating a seam produced between the overlapping balled end and flared end;
- a tightening mechanism connected to said first and second ends and having a fastener for drawing said first and second ends toward and away from each other to respectively tighten and loosen said band; and
- a clip having at least a pair of fingers used to retain the position of the balled end with respect to the ball joint pipe clamp, each of said fingers projecting axially beyond and radially below said first edge of said band, and each of said fingers defining a radially-inwardly facing surface that engages an outer surface of the balled end.

8. A ball joint pipe clamp to join a first pipe having a balled end and a second pipe having a flared end that overlaps the balled end, the ball joint pipe clamp comprising:
- a band extending axially from a first edge to a second edge and extending circumferentially from a first end to a second end, said band having a step formed circumferentially therearound and axially between said first and second edges, said step accommodating a seam produced between the overlapping balled end and flared end;
- wherein said band is pre-assembled to the flared end by a weld that is located adjacent said second edge; and
- a tightening mechanism connected to said first and second ends and having a fastener for drawing said first and second ends toward and away from each other to respectively tighten and loosen said band.

9. A ball joint, comprising:
- a first pipe having a nominal diameter alone at least a portion of the length of the pipe and having a balled end that extends from said nominal diameter portion to an axial edge of said first pipe, said balled end having an outer surface with a first radius;
- a second pipe having the same nominal diameter as the first pipe and having a flared end overlapping said balled end, said flared end having an inner surface with a second radius; and
- a pipe clamp including a band that overlaps both said balled end and said flared end, said band extending axially from a first edge to a second edge;
- wherein said first radius is greater than said second radius producing a circumferential sealing contact between said outer surface and said inner surface, said sealing contact being located at a free end of said flared end and a midsection of said balled end with said outer surface and said inner surface diverging away from said sealing contact in direction toward said axial edge of said balled end such that said axial edge of said balled end is separated from said inner surface of said flared end by a gap; and
- wherein said first edge of said band is positioned axially adjacent said gap.

10. A ball joint as defined in claim 9, wherein said pipe clamp is attached to said flared end at a position adjacent said first edge of said band.

11. A ball joint as defined in claim 10, wherein said pipe clamp is attached to said flared end via at least one weld between said band and said flared end.

12. A ball joint as defined in claim 9, wherein said band has a circumferentially-extending step located axially between said first and second edges.

13. A ball joint, comprising:
a balled end of a first pipe, said balled end having an outer surface with a first radius;
a flared end of a second pipe overlapping said balled end, said flared end having an inner surface with a second radius; and
a pipe clamp including a band that overlaps both said balled end and said flared end;
wherein said first radius is greater than said second radius producing a circumferential sealing contact between said outer surface and said inner surface, said sealing contact being located at a free end of said flared end and a midsection of said balled end with said outer surface and said inner surface diverging away from said sealing contact in direction toward a free end of said balled end;
wherein said diverging outer surface and inner surface define a gap located therebetween, wherein said band extends axially from a first edge to a second edge, and wherein said band is attached to said flared end by a weld that is located at an axial position that is adjacent said second edge and at a radial position that is adjacent said gap.

14. A ball joint comprising:
a balled end of a first pipe, said balled end having an outer surface with a first radius;
a flared end of a second pipe overlapping said balled end, said flared end having an inner surface with a second radius; and
a pipe clamp including a band that overlaps both said balled end and said flared end;
wherein said first radius is greater than said second radius producing a circumferential sealing contact between said outer surface and said inner surface, said sealing contact being located at a free end of said flared end and a midsection of said balled end with said outer surface and said inner surface diverging away from said sealing contact in direction toward a free end of said balled end;
wherein said balled end and said flared end overlap to produce a circumferential seam at said free end of said flared end, and wherein said band extends axially from a first edge to a second edge and forms a step circumferentially therearound and axially between said first edge and said second edge, said step accommodating said seam.

15. A ball joint as defined in claim 14, wherein said step forms an elevated side in said band having one radius, and forms an unelevated side in said band having another radius that is less than the radius of said elevated side.

16. A ball joint as defined in claim 15, wherein said elevated side bears substantially flush against an outer surface of said flared end, and said unelevated side bears substantially flush against said outer surface of said balled end.

17. A ball joint assembly, comprising:
a first pipe having a balled end with an outer surface having a first radius;
a second pipe having a flared end overlapping said balled end, said flared end having a free end and an inner surface having a second radius that is less than said first radius, said overlapping flared end and balled end producing a circumferential seam; and
a pipe clamp including:
a band overlapping both said balled end and said flared end, said band extending axially from a first edge to a second edge and extending circumferentially from a first end to a second end, said band having a step formed circumferentially therearound and axially between said first and second edges to accommodate said seam, said band being attached to said flared end at a weld point that is located adjacent said second edge; and
a tightening mechanism connected to said first and second ends and having a fastener for drawing said first and second ends toward and away from each other to respectively tighten and loosen said band;
wherein a circumferential sealing contact is produced between said outer surface and said inner surface and is located at said free end of said flared end and a midsection of said balled end with said outer surface and said inner surface diverging away from said sealing contact.

18. A ball joint assembly as defined in claim 17, wherein said step forms an elevated side in said band having one radius, and forms an unelevated side in said band having another radius that is less than the radius of said elevated side.

19. A ball joint assembly as defined in claim 18, wherein said elevated side bears substantially flush against an outer surface of said flared end, and said unelevated side bears substantially flush against said outer surface of said balled end.

20. A ball joint assembly as defined in claim 19, wherein said band has a single step formed circumferentially therearound and axially between said first and second edges.

* * * * *